United States Patent
Ishizuka et al.

(10) Patent No.: US 9,267,820 B2
(45) Date of Patent: Feb. 23, 2016

(54) TWO-DIMENSIONAL ABSOLUTE ENCODER AND SCALE WITH MARKS EACH HAVING ONE OF A PLURALITY OF DIFFERENT CHARACTERISTIC VALUES

(71) Applicant: CANON KABUSHIKI KAISHA, Tokyo (JP)

(72) Inventors: Ko Ishizuka, Saitama (JP); Makiko Ogasawara, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 114 days.

(21) Appl. No.: 14/022,625

(22) Filed: Sep. 10, 2013

(65) Prior Publication Data

US 2014/0070073 A1    Mar. 13, 2014

(30) Foreign Application Priority Data

Sep. 13, 2012  (JP) ................................. 2012-201707

(51) Int. Cl.
*G01D 5/347*     (2006.01)
*G01D 5/245*     (2006.01)

(52) U.S. Cl.
CPC .......... *G01D 5/34776* (2013.01); *G01D 5/2455* (2013.01); *G01D 5/34792* (2013.01)

(58) Field of Classification Search
CPC combination set(s) only.
See application file for complete search history.

(56) References Cited

U.S. PATENT DOCUMENTS

| 6,603,631 B1* | 8/2003 | Shirane et al. ............. 360/78.08 |
| 2006/0238776 A1 | 10/2006 | Chu |
| 2007/0170355 A1* | 7/2007 | Chin et al. ................ 250/231.13 |
| 2011/0157599 A1 | 6/2011 | Weaver |
| 2012/0326016 A1* | 12/2012 | Ishizuka ...................... 250/231.1 |

FOREIGN PATENT DOCUMENTS

| EP | 2538179 A2 | 12/2012 |
| JP | 11-248489 A | 9/1999 |
| JP | 2004-333498 A | 11/2004 |
| JP | 2008-525783 A | 7/2008 |

* cited by examiner

*Primary Examiner* — Francis M Legasse, Jr.
(74) *Attorney, Agent, or Firm* — Canon USA, Inc. IP Division

(57) ABSTRACT

A two-dimensional absolute encoder includes a scale having marks arranged thereon along first and second directions different from each other, a detector configured to perform first detection that detects rows of a first number of marks arranged in the first direction and second detection that detects rows of a second number of marks arranged in the second direction, and a processor configured to determine absolute positions of the scale in the first and second directions based on outputs from the detector. Each of the marks has one of different characteristic values each corresponding to a combination of a quantized first code for indicating a position in the first direction and a quantized second code for indicating a position in the second direction, the number of the different characteristic values being smaller than the number of the combinations.

11 Claims, 5 Drawing Sheets

TWO-DIMENSIONAL ABSOLUTE ENCODER AND SCALE WITH MARKS EACH HAVING ONE OF A PLURALITY OF DIFFERENT CHARACTERISTIC VALUES

BACKGROUND OF THE INVENTION

1. Field of the Invention

One disclosed aspect of the embodiments relates to a two-dimensional absolute encoder and a scale.

2. Description of the Related Art

Incremental and absolute encoders have been used, for example, to measure the position of a stage of a mechanical apparatus. The application of incremental encoders to the fields of machine tools and robots is particularly limited, because incremental encoders cannot obtain absolute position information without first detecting an origin. On the other hand, absolute encoders do not need to detect an origin because they may obtain absolute position information.

Typically, to obtain a position of an object in two dimensions (in the X and Y directions) using an absolute encoder, two absolute linear encoders are attached to respective orthogonal side faces of a stage. However, it is often required to mount a two-dimensional scale on one surface, such as an upper or lower surface, of the stage. As a two-dimensional scale having absolute codes, Japanese Patent Laid-Open No. 11-248489 discloses one in which two-dimensional patterns used to determine absolute positions are discretely arranged in a plane. In the two-dimensional scale disclosed in Japanese Patent Laid-Open No. 11-248489, to assign absolute position information to each grid region, the grid region is divided into a plurality of sub-regions (elements). Then, one of two types of code information, either white or black, is assigned to each sub-region.

PCT Japanese Translation Patent Publication No. 2008-525783 also discloses a two-dimensional scale in which two-dimensional patterns used to determine absolute positions are discretely arranged in a plane. In the scale disclosed in PCT Japanese Translation Patent Publication No. 2008-525783, color patterns of red, blue, green, and the like are arranged around each of measurement points spaced at regular intervals, so that absolute position information is expressed by the arrangement of the color patterns. In a two-dimensional scale disclosed in Japanese Patent Laid-Open No. 2004-333498, a plane is divided into grid regions, each of which includes a two-dimensional quasi-random pattern portion and a two-dimensional code portion. An absolute encoder disclosed in Japanese Patent Laid-Open No. 2004-333498 simultaneously detects two-dimensional quasi-random pattern portions and two-dimensional code portions, and determines a two-dimensional absolute position from the resulting two-dimensional image pattern.

The two-dimensional absolute encoders disclosed in Japanese Patent Laid-Open No. 11-248489, PCT Japanese Translation Patent Publication No. 2008-525783, and Japanese Patent Laid-Open No. 2004-333498 all require a scale on which two-dimensional patterns each representing an absolute position are discretely arranged, and thus cannot easily achieve high resolution comparable to that of incremental encoders.

SUMMARY OF THE INVENTION

One disclosed aspect of the embodiments provides, for example, a high-resolution two-dimensional absolute encoder.

One embodiment in its first aspect provides a two-dimensional absolute encoder including a scale having a plurality of marks arranged thereon along a first direction and a second direction different from each other, a detector configured to perform first detection that detects rows of a first number of marks arranged in the first direction and second detection that detects rows of a second number of marks arranged in the second direction, and a processor configured to determine absolute positions of the scale in the first direction and the second direction based on outputs from the detector. Each of the plurality of marks has one of a plurality of different characteristic values each corresponding to a combination of a quantized first code for indicating a position in the first direction and a quantized second code for indicating a position in the second direction, the number of the plurality of different characteristic values being smaller than the number of the combinations. The processor is configured to generate a first code sequence including the first number of the first codes based on a result of the first detection, determine an absolute position of the scale in the first direction based on the first code sequence, generate a second code sequence including the second number of the second codes based on a result of the second detection, and determine an absolute position of the scale in the second direction based on the second code sequence.

Further features of the disclosure will become apparent from the following description of exemplary embodiments with reference to the attached drawings.

DESCRIPTION OF THE EMBODIMENTS

Embodiments of the disclosure will now be described in detail with reference to the attached drawings.

First Embodiment

Figure 1:
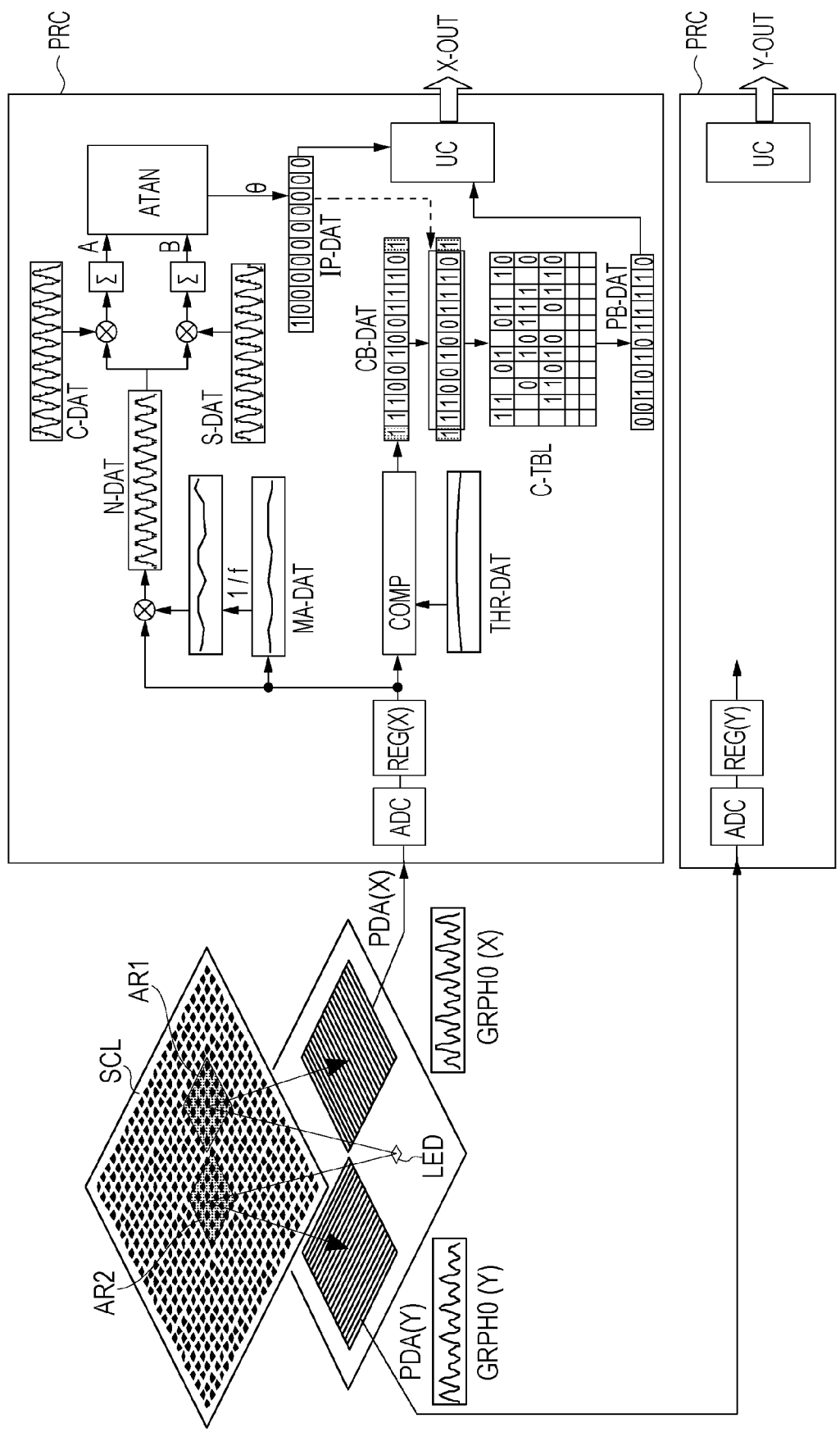
FIG. 1 illustrates a configuration of a two-dimensional absolute encoder according to a first embodiment.

FIG. 1 illustrates a configuration of a two-dimensional absolute encoder according to a first embodiment.

As illustrated in FIG. 1, a two-dimensional scale SCL (lower surface) is illuminated with diverging light beams from a light-emitting element LED, and the reflected light is magnified and projected onto a one-dimensional light-receiving element array PDA(X) and a one-dimensional light-receiving element array PDA(Y).

Figure 2:
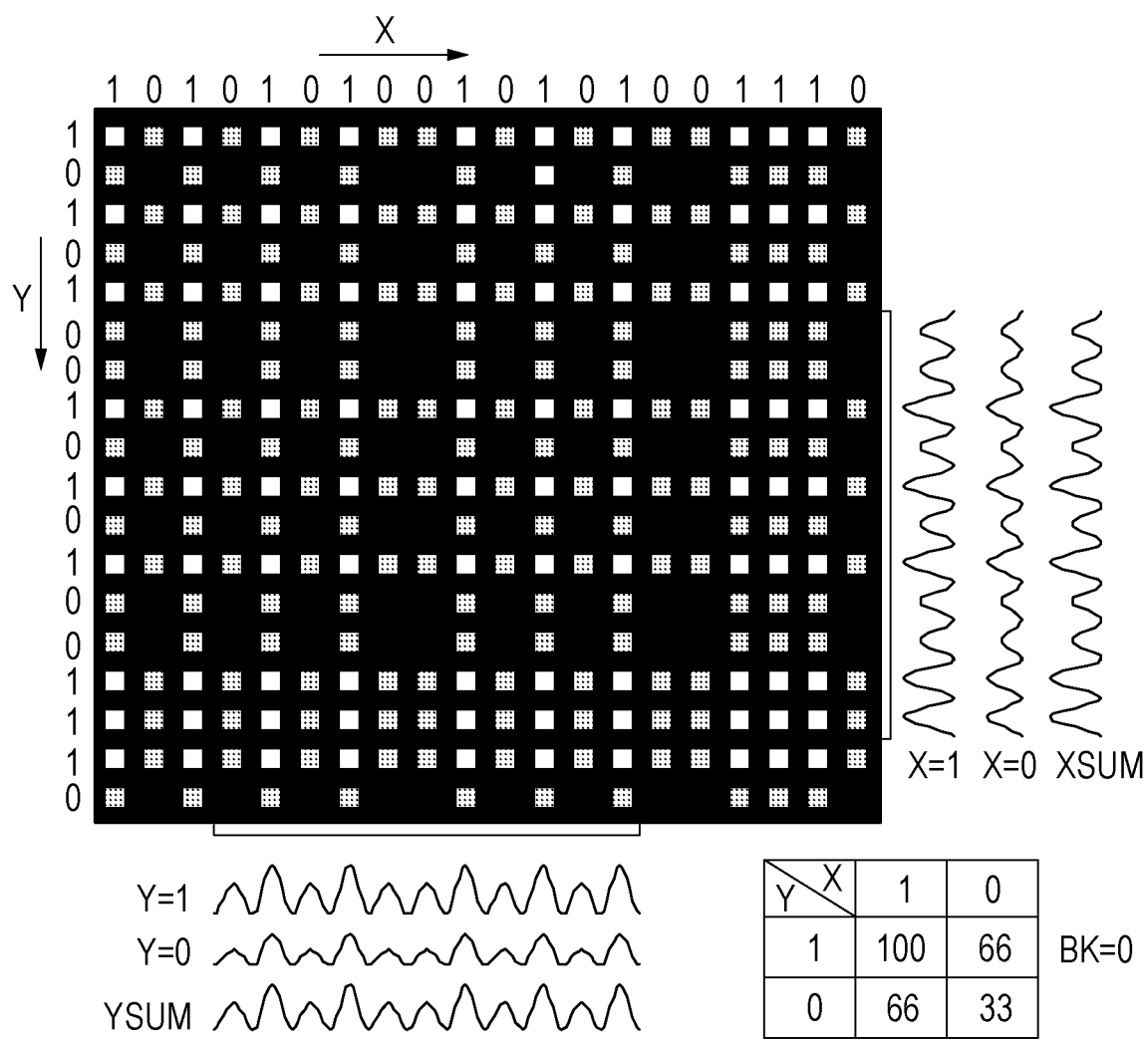
FIG. 2 illustrates a configuration of a two-dimensional scale.

As illustrated in FIG. 2, in the two-dimensional scale SCL for the two-dimensional absolute encoder, a plurality of square reflective portions (marks) are two-dimensionally arranged on a non-reflective substrate (having a reflectance of 0%) at predetermined pitches along two directions (first and second directions) orthogonal to each other. Reflection characteristics (reflectances) of the reflective portions have tones (gradation or grey scale) that follow the following rules.

1. Cyclic codes (also referred to as circulating codes) are created for each of the X and Y axes, and the code values of the cyclic codes for the X axis are associated with the code values of the cyclic codes for the Y axis, in a one-to-one (1:1) correspondence, at respective coordinate (or grid) points; and 2. a reflectance of a reflective portion at each grid point is defined for a combination of a code of an X coordinate (first code) and a code of a Y coordinate (second code) as follows:

when the code of the X coordinate is 0 and the code of the Y coordinate is 0 (i.e., in the case of (0, 0)), the reflectance is 33%;

when the code of the X coordinate is 1 and the code of the Y coordinate is 0 (i.e., in the case of (1, 0)), the reflectance is 66%;

when the code of the X coordinate is 0 and the code of the Y coordinate is 1 (i.e., in the case of (0, 1)), the reflectance is 66%; and when the code of the X coordinate is 1 and the code of the Y coordinate is 1 (i.e., in the case of (1, 1)), the reflectance is 100%.

It is defined as a rule that in the two cases where the codes of the X and Y coordinates are the same, the corresponding two tones are different, whereas in the two cases where the codes of the X and Y coordinates are different, the corresponding two tones are the same.

A tone assignment may be done, for example, by adding or removing a thin film to or from each reflective portion, by varying the size of each reflective portion, or by partly forming reflective portions with hatching patterns or the like. The tone assignment may be done by other methods as long as it is possible to increase or decrease the amount of reflected light. In FIG. 2, reflective portions having a reflectance of 33% are densely hatched, reflective portions having a reflectance of 66% are lightly hatched, and reflective portions having a reflectance of 100% are not hatched (i.e., shown in white). Each of the plurality of reflective portions forms a mark that includes information of both a first code obtained by quantization and used to indicate a position on the X axis (in the first direction) and a second code obtained by quantization and used to indicate a position on the Y axis (in the second direction).

In the light-receiving element array PDA(X) illustrated in FIG. 1, light-receiving elements (photoelectric conversion elements) are arranged in the X direction for detection of X coordinates (i.e., positions on the X axis). The light-receiving element array PDA(X) receives a light beam reflected from a rectangular region AR1 of the scale SCL (first detection). The light-receiving element array PDA(X) is positioned such that N light-receiving elements correspond to one reflective portion. The light-receiving elements of the light-receiving element array PDA(X) are arranged at predetermined intervals (typically at regular intervals). Thus, the light-receiving elements of the light-receiving element array PDA(X) are arranged along the X axis at pitches smaller than those of the reflective portions (marks) in the X direction. Here, the number of bits of an absolute code (first number) is M=10, the number of light-receiving elements corresponding to one reflective portion is N=12, and the total number of light-receiving elements (i.e., the number of channels) of the light-receiving element array PDA(X) is (M+1)×N=132. Hence, 11 periods of periodic signals may be always obtained in the 132 channels of the light-receiving element array PDA(X). The signal intensity varies depending on whether the code in the Y direction is 1 or 0. Therefore, when reflected light from a plurality of reflective portions arranged in the Y direction is received by a narrow light-receiving surface elongated in the Y direction, the amount of light optically accumulated (averaged) in the Y direction is obtained. The lower part of FIG. 2 shows a light intensity pattern (periodic signal) generated when light from only a row of reflective portions where codes of Y coordinates are 1 is received, a light intensity pattern generated when light from only a row of reflective portions where codes of Y coordinates are 0 is received, and a light intensity pattern generated when light from a plurality of rows of reflective portions arranged in the Y direction is simultaneously received.

Similarly, in the light-receiving element array PDA(Y) illustrated in FIG. 1, light-receiving elements (photoelectric conversion elements) are arranged in the Y direction for detection of Y coordinates (i.e., positions on the Y axis). The light-receiving element array PDA(Y) receives a light beam reflected from a rectangular region AR2 of the scale SCL (second detection). The light-receiving element array PDA (Y) is positioned such that N light-receiving elements correspond to one reflective portion. The light-receiving elements of the light-receiving element array PDA(Y) are arranged at predetermined intervals. Thus, the light-receiving elements of the light-receiving element array PDA(Y) are arranged along the Y axis at pitches smaller than those of the reflective portions (marks) in the Y direction. Here, the number of bits of an absolute code (second number) is M=10, the number of light-receiving elements corresponding to one reflective portion is N=12, and the total number of light-receiving elements (i.e., the number of channels) of the light-receiving element array PDA(Y) is (M+1)×N=132. Hence, 11 periods of periodic signals may be always obtained in the 132 channels of the light-receiving element array PDA(Y). The signal intensity varies depending on whether the code in the X direction is 1 or 0. Therefore, when reflected light from a plurality of reflective portions arranged in the X direction is received by a narrow light-receiving surface elongated in the X direction, the amount of light optically accumulated (averaged) in the X direction is obtained. The right part of FIG. 2 shows a light intensity pattern (periodic signal) generated when light from only a row of reflective portions where codes of X coordinates are 1 is received, a light intensity pattern generated when light from only a row of reflective portions where codes of X coordinates are 0 is received, and a light intensity pattern generated when light from a plurality of rows of reflective portions arranged in the X direction is simultaneously received.

As described above, the light-receiving element array PDA (X) detects the first number of marks arranged in the first direction, and the light-receiving element array PDA(Y) detects the second number of marks arranged in the second direction. For each of the X and Y axes, a periodic signal may be obtained, which is amplitude-modulated such that the magnitude of a code corresponds to the magnitude of an amplitude.

Referring to FIG. 1, GRPH0(X) and GRPH0(Y) indicate the quantity distributions of light beams projected via the scale SCL onto the light-receiving element arrays PDA(X) and PDA(Y), respectively. A plurality of electric signals corresponding to light quantities are output from the elements of the light-receiving element arrays PDA(X) and PDA(Y). In the present embodiment, complementary metal oxide semiconductor (CMOS) image sensors are used as the light-receiving element arrays PDA(X) and PDA(Y). Each of the image sensors accumulates electric charge therein in accordance with a data acquisition command (photoelectron accumulation command) from the outside, and sequentially outputs signals corresponding to the accumulated electric charge in accordance with a clock signal applied thereto from the outside. The signals output from the light-receiving element arrays PDA(X) and PDA(Y) are converted, by the corresponding analog-to-digital (AD) converters ADC in respective signal processing systems (processors PRC), into digital signals and stored in registers as REG(X) and REG(Y). Ideally, the light quantity distributions GRPH0(X) and GRPH0(Y) illustrated in FIG. 1 are obtained by amplitude-modulating sine waves with mark rows. In practice, however, the light quantity distributions GRPH0(X) and GRPH0(Y) may be distorted, for example, into triangular waves or trapezoidal waves by varying distances between the scale SCL and the light-receiving element arrays PDA(X) and PDA(Y). These two light quantity distributions are converted, via the light-receiving element arrays PDA(X) and PDA(Y), to waveform data REG(X) and REG(Y) each having (M+1)×N=132 channels.

In the scale SCL, the subsequent processing for the X axis (first direction) and that for the Y axis (second direction) are performed independently of, but similarly to, each other. Therefore, the processing for the X axis will be described as an example.

First, on the basis of the waveform data REG(X) for the light-receiving element array PDA(X), cyclic codes corresponding to an absolute position of the scale SCL on the X axis are determined. For this, a comparator COMP that compares sizes of the waveform data REG(X) and threshold data THR-DAT binarizes each periodic signal or each set of 12 pieces of data (12 pixels). This binarization generates cyclic code data CB-DAT (first code sequence, or second code sequence for the Y axis). The number of bits of the cyclic code data CB-DAT is one bit greater than the number of bits of the cyclic codes (M=10) (although the number of extra bits is not limited to one). This is because the number of channels of each of the light-receiving element arrays PDA(X) and PDA(Y) is greater by an amount corresponding to a one-bit absolute code (i.e., corresponding to 12 light-receiving elements).

At the same time, moving average data MA-DAT for the waveform data REG(X) is generated, the reciprocal of the moving average data MA-DAT is calculated, and the waveform data REG(X) is multiplied by the calculated reciprocal. Thus, the amplitude of the waveform data REG(X) obtained by amplitude modulation with a mark row is normalized, and periodic signal waveform data N-DAT having a constant amplitude is generated and stored in a register (not shown). Note that the size of a filter that generates the moving average data MA-DAT may correspond to 11 elements (pixels) of the waveform data REG(X). More precisely, the size of the filter may be obtained by dividing, by 12, the sum of the value of a pixel in the middle, the values of five pixels both before and after the pixel in the middle, and the half-value of one pixel each on the right and left outside the five pixels. In this case, the size of a moving average filter is equivalent to 12 pixels.

The periodic signal waveform data N-DAT is multiplied, by a multiplier, by cosine wave reference waveform data C-DAT having the same number of pieces of data as the periodic signal waveform data N-DAT, and the sum of the resulting values is calculated. This generates a signal A. Similarly, the periodic signal waveform data N-DAT is multiplied, by a multiplier, by sine wave reference waveform data S-DAT having the same number of pieces of data as the periodic signal waveform data N-DAT, and the sum of the resulting values is calculated. This generates a signal B. The signals A and B obtained by these calculations are equivalent to a two-phase signal (A-phase and B-phase signals) of a so-called incremental encoder, the two-phase signal having a phase difference of 90 degrees.

The calculations described above are performed to eliminate or reduce harmonic and direct-current components from a periodic signal by multiplying the periodic signal by a sine wave or a cosine wave and performing a definite integral in the range of an integral multiple of the period. The harmonic and direct-current components cannot be completely eliminated in practice, because the size and the number of light-receiving elements in the light-receiving element array are limited. In the present embodiment, since light corresponding to one period of a light intensity pattern is received by 12 light-receiving elements of the light-receiving element array, harmonic components of only the 2nd, 3rd, 4th, 6th, and 12th orders may be effectively eliminated. In the case of an optical encoder, since distortion components (harmonic components) are often those of the 2nd, 3rd, and 4th orders, using the 12 light-receiving elements for one period of a light intensity pattern is effective enough for practical purposes.

Next, the signals A and B are subjected to phase calculation (arctan(A/B)) by an arctangent calculator ATN. If the number of bits K in a phase calculator is 11, the number of divisions is $2^{11}=2048$, and interpolation part data IP-DAT may be obtained as absolute position information (third position data, or fourth position data for the Y axis) with a resolution which divides one period into 2048 parts.

Since the cyclic code data CB-DAT obtained as above is composed of N+1=11 elements (codes), it is necessary to select N=10 elements depending on the value of the interpolation data IP-DAT. This selection may be made by selecting N=10 codes, in accordance with the interpolation part data (phase data) IP-DAT obtained by the arctangent calculator ATN, from 11 codes obtained by the comparator COMP which assigns codes 1 and 0 to large and small amplitudes, respectively.

The cyclic code data determined as described above is converted, using a conversion table C-TBL, to pure binary data PB-DAT (first position data, or second position data for the Y axis) representing an absolute position. A unit converter UC combines the pure binary data PB-DAT with the interpolation part data IP-DAT (position data) to determine an absolute position for each grating pitch of the scale. Additionally, the unit converter UC multiplies the absolute position for each grating pitch by the value of the grating pitch (e.g., 80 microns) and outputs absolute position information X-OUT (position information) obtained by conversion into information expressed in predetermined units (e.g., microns). Processing for outputting absolute position information for the Y axis (second direction) of the scale SCL is the same as that for the X axis (first direction).

The two-dimensional absolute encoder configured as described above uses a detection head for the X-axis direction and a detection head for the Y-axis direction to make detection, for a given point on the two-dimensional scale SCL, by averaging a plurality of periodic signal sequences corresponding to a plurality of mark rows. Therefore, a phase value (i.e., an interpolation value between 10-bit absolute codes, or a fractional part of an absolute position) interpolated by arctangent calculation may be obtained with precision as high as that of an incremental encoder of related art. Since the detection is done by averaging a plurality of periodic signal sequences corresponding to a plurality of mark rows, the detection is less susceptible to errors in drawing the edges of marks. Therefore, an absolute code (also referred to as an integer part of the absolute position) may also be detected with very high precision. Thus, in the present embodiment, even if there are some mounting errors between the detection heads and the two-dimensional scale, it is possible to realize a high-precision and high-resolution two-dimensional absolute encoder.

Second Embodiment

Figure 3:
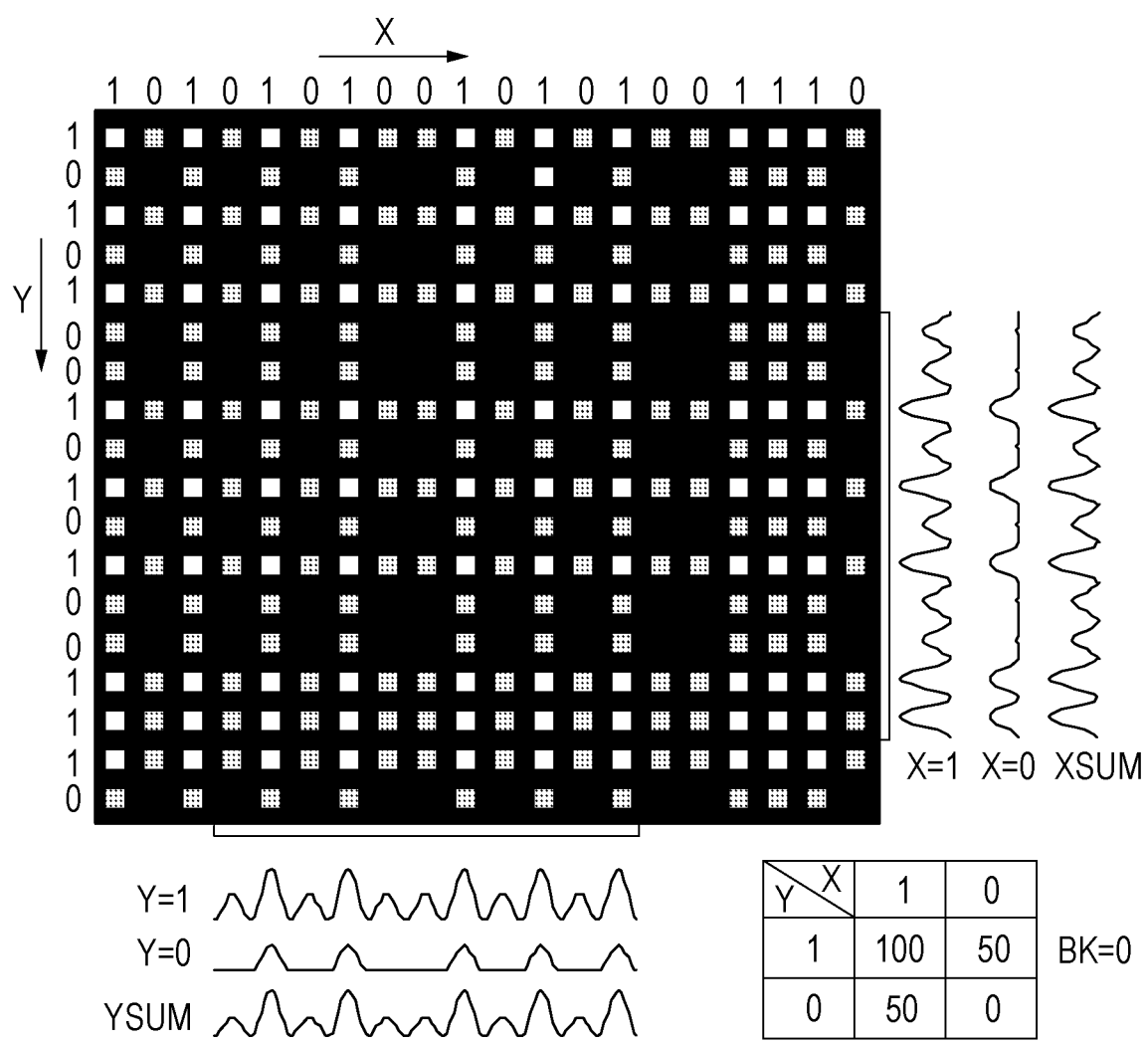
FIG. 3 illustrates a configuration of a two-dimensional scale according to a second embodiment.

FIG. 3 illustrates a configuration of a two-dimensional scale according to a second embodiment. The second embodiment differs from the first embodiment in terms of the configuration of the two-dimensional scale. As illustrated in FIG. 3, in the two-dimensional scale SCL, a plurality of square reflective portions (marks) are two-dimensionally arranged on a non-reflective substrate (having a reflectance of 0%) at predetermined pitches along two directions (first and second directions) orthogonal to each other. Reflectances of the reflective portions have tones that follow the following rules.

1. Cyclic codes are created for each of the X and Y axes, and the code values of the cyclic codes for the X axis are associated with the code values of the cyclic codes for the Y axis, in a one-to-one (1:1) correspondence, at respective coordinate (or grid) points; and 2. a reflectance of a reflective portion at each grid point is defined for a combination of a code of an X coordinate (first code) and a code of a Y coordinate (second code) as follows:

when the code of the X coordinate is 0 and the code of the Y coordinate is 0 (i.e., in the case of (0, 0)), the reflectance is 0%;

when the code of the X coordinate is 1 and the code of the Y coordinate is 0 (i.e., in the case of (1, 0)), the reflectance is 50%;

when the code of the X coordinate is 0 and the code of the Y coordinate is 1 (i.e., in the case of (0, 1)), the reflectance is 50%; and when the code of the X coordinate is 1 and the code of the Y coordinate is 1 (i.e., in the case of (1, 1)), the reflectance is 100%.

It is defined as a rule that in the two cases where the codes of the X and Y coordinates are the same, the corresponding two tones are different, whereas in the two cases where the codes of the X and Y coordinates are different, the corresponding two tones are the same.

In the configuration of the two-dimensional scale of the present embodiment, a light quantity distribution of reflected light in the X direction varies in accordance with codes of the Y coordinates, as in the case of the first embodiment. When the code of the Y coordinate is 0, the periodic signal is partially lost (at a grid point (0, 0)). However, by simultaneously receiving beams of reflected light from a plurality of rows of reflective portions arranged in the Y direction, a periodic signal waveform may be obtained, without any loss of the periodic signal, in which the codes 1 and 0 of the X coordinates correspond to large and small amplitudes, respectively.

Similarly, a light quantity distribution of reflected light in the Y direction varies in accordance with codes of the X coordinates, as in the case of the first embodiment. When the code of the X coordinate is 0, the periodic signal is partially lost (at a grid point (0, 0)). However, by simultaneously receiving beams of reflected light from a plurality of rows of reflective portions arranged in the X direction, a periodic signal waveform may be obtained, without any loss of the periodic signal, in which the codes 1 and 0 of the Y coordinates correspond to large and small amplitudes, respectively.

In the two-dimensional scale of the present embodiment, absolute position information for the two axes may be output by combination with signal processing systems similar to those described with reference to FIG. 1. However, it is necessary to ensure that when beams of reflected light from a plurality of mark rows arranged in the Y-axis direction are simultaneously received to obtain code information for the X axis, not all codes of the Y coordinates in the light receiving range become 0. Similarly, it is necessary to ensure that when beams of reflected light from a plurality of mark rows arranged in the X-axis direction are simultaneously received to obtain code information for the Y axis, not all codes of the X coordinates in the light receiving range become 0.

Third Embodiment

Figure 4A:
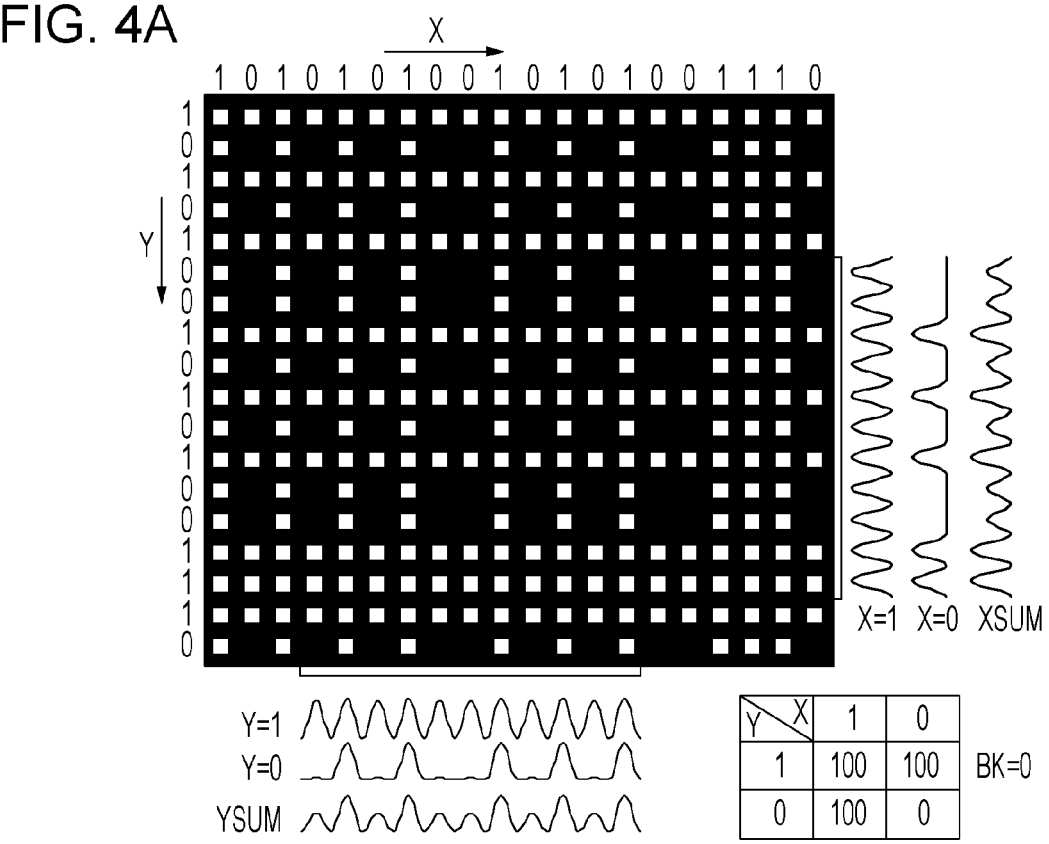
FIGS. 4A and 4B each illustrate a configuration of a two-dimensional scale according to a third embodiment.
Figure 4B:
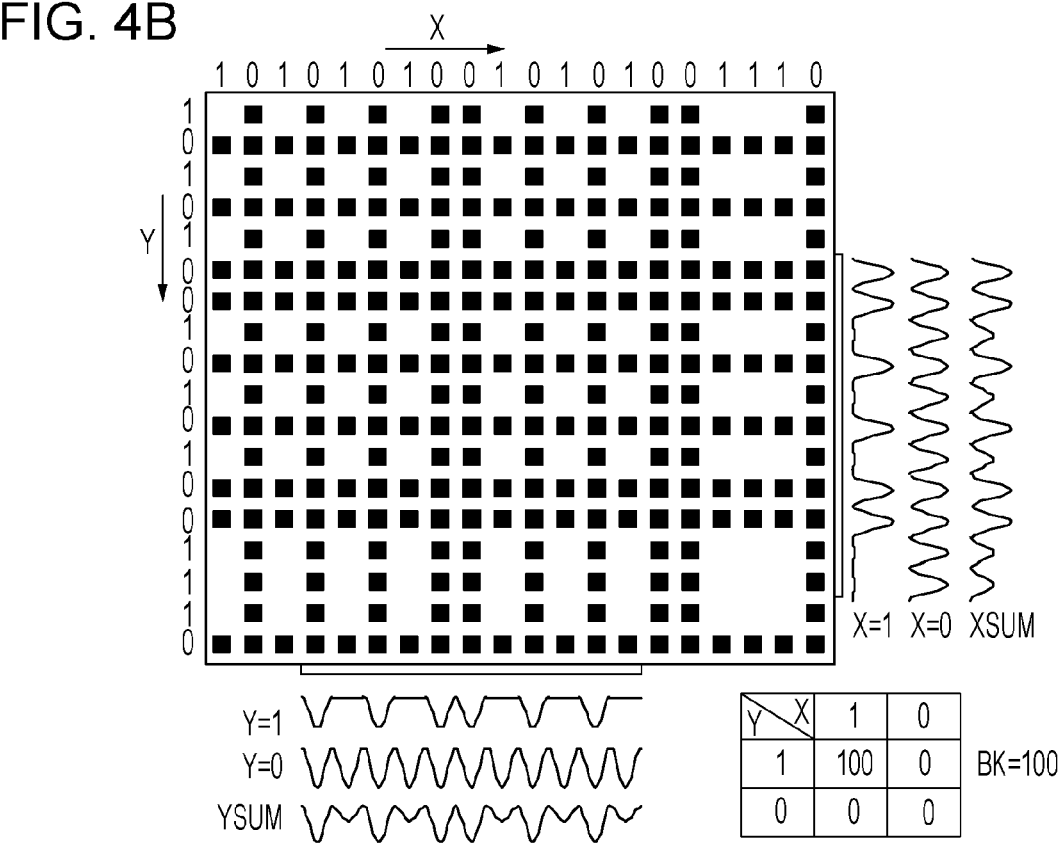

FIGS. 4A and 4B each illustrate a configuration of a two-dimensional scale according to a third embodiment. The third embodiment differs from the first embodiment in terms of the configuration of the two-dimensional scale. As illustrated in FIG. 4A, in the two-dimensional scale SCL, a plurality of square reflective portions (marks) are two-dimensionally arranged on a non-reflective substrate (having a reflectance of 0%) at predetermined pitches along two directions (first and second directions) orthogonal to each other. Reflectances of the reflective portions have tones that follow the following rules.

1. Cyclic codes are created for each of the X and Y axes, and the code values of the cyclic codes for the X axis are associated with the code values of the cyclic codes for the Y axis, in a one-to-one (1:1) correspondence, at respective coordinate (or grid) points; and 2. a reflectance of a reflective portion at each grid point is defined for a combination of a code of an X coordinate (first code) and a code of a Y coordinate (second code) as follows:

when the code of the X coordinate is 0 and the code of the Y coordinate is 0 (i.e., in the case of (0, 0)), the reflectance is 0%;

when the code of the X coordinate is 1 and the code of the Y coordinate is 0 (i.e., in the case of (1, 0)), the reflectance is 100%;

when the code of the X coordinate is 0 and the code of the Y coordinate is 1 (i.e., in the case of (0, 1)), the reflectance is 100%; and when the code of the X coordinate is 1 and the code of the Y coordinate is 1 (i.e., in the case of (1, 1)), the reflectance is 100%.

It is defined as a rule that in the two cases where the codes of the X and Y coordinates are the same, the corresponding two tones are different, whereas in the two cases where the codes of the X and Y coordinates are different, the corresponding two tones are the same.

In the configuration of the two-dimensional scale of the present embodiment, a light quantity distribution of reflected light in the X direction varies in accordance with codes of the Y coordinates. When the code of the Y coordinate is 0, the periodic signal is partially lost (at a grid point (0, 0)). However, by simultaneously receiving beams of reflected light from a plurality of rows of reflective portions arranged in the Y direction, a periodic signal waveform may be obtained, without any loss of the periodic signal, in which the codes 1 and 0 of the X coordinates correspond to large and small amplitudes, respectively.

Similarly, a light quantity distribution of reflected light in the Y direction varies in accordance with codes of the X coordinates. When the code of the X coordinate is 0, the periodic signal is partially lost (at a grid point (0, 0)). However, by simultaneously receiving beams of reflected light from a plurality of rows of reflective portions arranged in the X direction, a periodic signal waveform may be obtained, without any loss of the periodic signal, in which the codes 1 and 0 of the Y coordinates correspond to large and small amplitudes, respectively.

In the two-dimensional scale of the present embodiment, absolute position information for the two axes may be output by combination with signal processing systems similar to those of the first embodiment. However, it is necessary to ensure that when beams of reflected light from a plurality of mark rows arranged in the Y-axis direction are simultaneously received to obtain code information for the X axis, not all codes of the Y coordinates in the light receiving range become the same. Similarly, it is necessary to ensure that when beams of reflected light from a plurality of mark rows arranged in the X-axis direction are simultaneously received to obtain code information for the Y axis, not all codes of the X coordinates in the light receiving range become the same.

FIG. 4B illustrates a modification of the two-dimensional scale SCL according to the present embodiment. In the two-dimensional scale SCL, a plurality of square reflective portions (marks) are two-dimensionally arranged on a reflective substrate (having a reflectance of 100%) at predetermined pitches along two directions (first and second directions) orthogonal to each other. Reflectances of the reflective portions have tones that follow the following rules.

1. Cyclic codes are created for each of the X and Y axes, and the code values of the cyclic codes for the X axis are associated with the code values of the cyclic codes for the Y axis, in a one-to-one (1:1) correspondence, at respective coordinate (or grid) points; and 2. a reflectance of a reflective portion at each grid point is defined for a combination of a code of an X coordinate (first code) and a code of a Y coordinate (second code) as follows:

when the code of the X coordinate is 0 and the code of the Y coordinate is 0 (i.e., in the case of (0, 0)), the reflectance is 0%;

when the code of the X coordinate is 1 and the code of the Y coordinate is 0 (i.e., in the case of (1, 0)), the reflectance is 0%;

when the code of the X coordinate is 0 and the code of the Y coordinate is 1 (i.e., in the case of (0, 1)), the reflectance is 0%; and when the code of the X coordinate is 1 and the code of the Y coordinate is 1 (i.e., in the case of (1, 1)), the reflectance is 100%.

It is defined as a rule that in the two cases where the codes of the X and Y coordinates are the same, the corresponding two tones are different, whereas in the two cases where the codes of the X and Y coordinates are different, the corresponding two tones are the same.

In the configuration of the two-dimensional scale of the present modification, a light quantity distribution of reflected light in the X direction varies in accordance with codes of the Y coordinates. When the code of the Y coordinate is 1, the periodic signal is partially lost. However, by simultaneously receiving beams of reflected light from a plurality of rows of reflective portions arranged in the Y-axis direction, a periodic signal waveform may be obtained, without any loss of the periodic signal, in which the codes 1 and 0 of the X coordinates correspond to large and small amplitudes, respectively.

Similarly, a light quantity distribution of reflected light in the Y direction varies in accordance with codes of the X coordinates. When the code of the X coordinate is 1, the periodic signal is partially lost. However, by simultaneously receiving beams of reflected light from a plurality of rows of reflective portions arranged in the X-axis direction, a periodic signal waveform may be obtained, without any loss of the periodic signal, in which the codes 1 and 0 of the Y coordinates correspond to large and small amplitudes, respectively.

In the two-dimensional scale of the present modification, absolute position information for the two axes may be output by combination with signal processing systems similar to those of the first embodiment. However, it is necessary to ensure that when beams of reflected light from a plurality of mark rows arranged in the Y-axis direction are simultaneously received to obtain code information for the X axis, not all codes of the Y coordinates in the light receiving range become the same. Similarly, it is necessary to ensure that when beams of reflected light from a plurality of mark rows arranged in the X-axis direction are simultaneously received to obtain code information for the Y axis, not all codes of the X coordinates in the light receiving range become the same.

Additionally, in the two-dimensional scale SCL of the present embodiment, a reflectance of a reflective portion at each grid point may be defined in the following modified way, depending on the combination of a code of an X coordinate and a code of a Y coordinate.

Reflectance of substrate: 0%
Reflectance in the case of (0, 0): 100%
Reflectance in the case of (1, 0): 100%
Reflectance in the case of (0, 1): 100%
Reflectance in the case of (1, 1): 0%

The present embodiment uses an additional rule in which the tone in the case of (1, 0) and the tone of the substrate are different from each other. This makes it possible to always obtain a periodic signal. Thus, in the two-dimensional scale of the third embodiment, the number of reflectance tones of the reflective portions is two (or one excluding the reflectance tone equal to the reflectance of the substrate). Therefore, the present embodiment may provide a two-dimensional absolute encoder or a two-dimensional scale for the two-dimensional absolute encoder which is advantageous in terms of manufacturing costs.

Fourth Embodiment

Figure 5A:
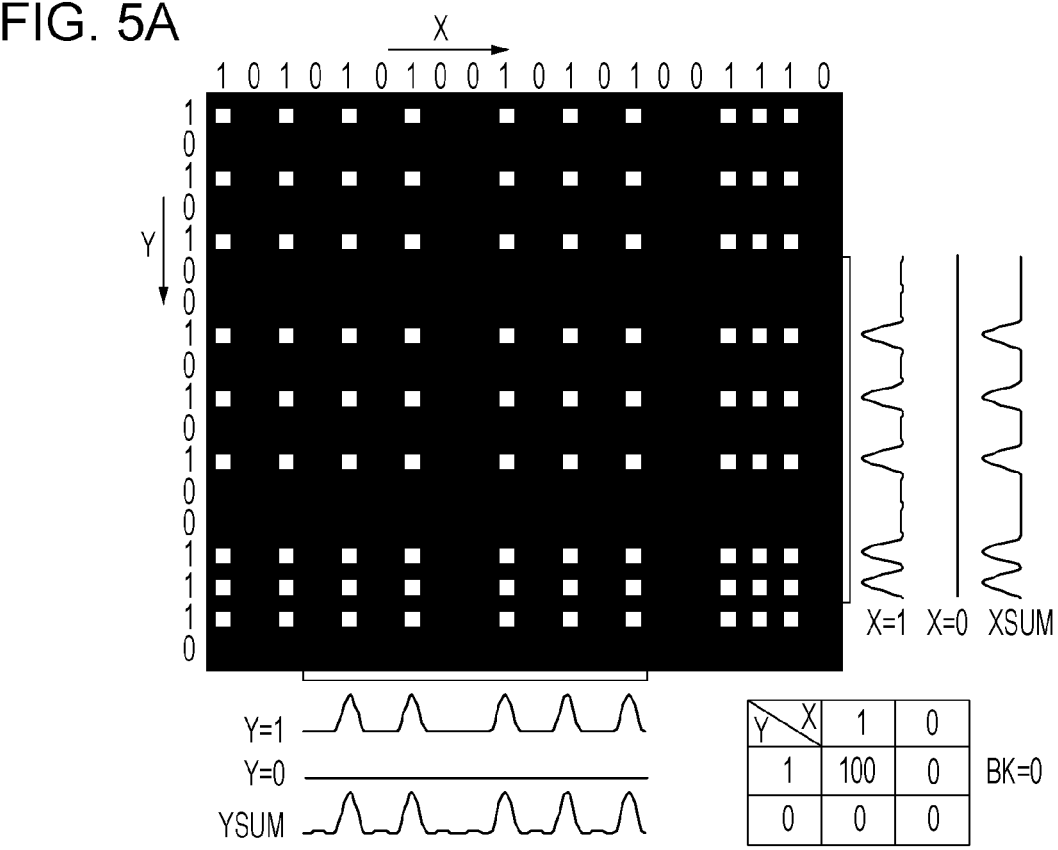
FIGS. 5A and 5B each illustrate a configuration of a two-dimensional scale according to a fourth embodiment.
Figure 5B:
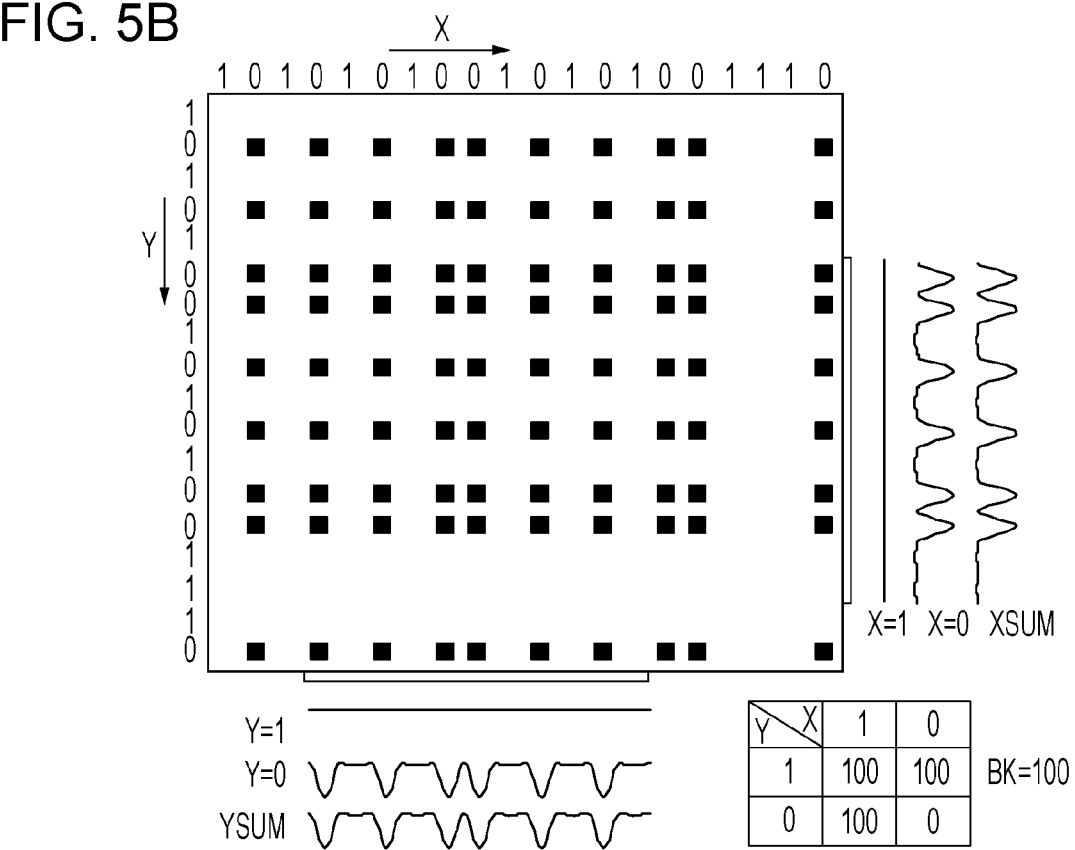

FIGS. 5A and 5B each illustrate a configuration of a two-dimensional scale according to a fourth embodiment. The fourth embodiment differs from the first embodiment in terms of the configuration of the two-dimensional scale. As illustrated in FIG. 5A, in the two-dimensional scale SCL, a plurality of square reflective portions (marks) are two-dimensionally arranged on a non-reflective substrate (having a reflectance of 0%) at predetermined pitches along two directions (first and second directions) orthogonal to each other. Reflectances of the reflective portions have tones that follow the following rules.

1. Cyclic codes are created for each of the X and Y axes, and the code values of the cyclic codes for the X axis are associated with the code values of the cyclic codes for the Y axis, in a one-to-one (1:1) correspondence, at respective coordinate (or grid) points; and 2. a reflectance of a reflective portion at each grid point is defined for a combination of a code of an X coordinate (first code) and a code of a Y coordinate (second code) as follows:

when the code of the X coordinate is 0 and the code of the Y coordinate is 0 (i.e., in the case of (0, 0)), the reflectance is 0%;

when the code of the X coordinate is 1 and the code of the Y coordinate is 0 (i.e., in the case of (1, 0)), the reflectance is 0%;

when the code of the X coordinate is 0 and the code of the Y coordinate is 1 (i.e., in the case of (0, 1)), the reflectance is 0%; and when the code of the X coordinate is 1 and the code of the Y coordinate is 1 (i.e., in the case of (1, 1)), the reflectance is 100%.

It is defined as a rule that in the two cases where the codes of the X and Y coordinates are the same, the corresponding two tones are different, whereas in the two cases where the codes of the X and Y coordinates are different, the corresponding two tones are the same.

In the configuration of the two-dimensional scale of the present embodiment, a light quantity distribution of reflected light in the X direction varies in accordance with codes of the Y coordinates. When the code of the Y coordinate is 0, the periodic signal cannot be obtained. However, by simultaneously receiving beams of reflected light from a plurality of rows of reflective portions arranged in the Y direction, a periodic signal waveform may be obtained, in which the codes 1 and 0 of the X coordinates correspond to the presence and absence of the amplitude, respectively.

Similarly, a light quantity distribution of reflected light in the Y direction varies in accordance with codes of the X coordinates. When the code of the X coordinate is 0, the periodic signal cannot be obtained. However, by simultaneously receiving beams of reflected light from a plurality of rows of reflective portions arranged in the X direction, a periodic signal waveform may be obtained, in which the codes 1 and 0 of the Y coordinates correspond to the presence and absence of the amplitude, respectively.

In the two-dimensional scale of the present embodiment, absolute position information for the two axes may be output by combination with signal processing systems similar to those of the first embodiment. However, it is necessary to ensure that when beams of reflected light from a plurality of mark rows arranged in the Y-axis direction are simultaneously received to obtain code information for the X axis, not all codes of the Y coordinates in the light receiving range become the same. Similarly, it is necessary to ensure that when beams of reflected light from a plurality of mark rows arranged in the X-axis direction are simultaneously received to obtain code information for the Y axis, not all codes of the X coordinates in the light receiving range become the same. Also, it is to be noted that since amplitude information (periodic signal) is partially lost with this technique, interpolation cannot be performed by the signal processing systems similar to those of the first embodiment. Specifically, interpolation may involve a division by 0 at a moving average. In this case, for example, by using the technique of assigning a predetermined value instead of performing the division, the amplitudes of the waveform data REG(X) and REG(Y) may be normalized.

FIG. 5B illustrates a modification of the two-dimensional scale SCL according to the present embodiment. In the two-dimensional scale SCL, a plurality of square reflective portions (marks) are two-dimensionally arranged on a reflective substrate (having a reflectance of 100%) at predetermined pitches along two directions (first and second directions) orthogonal to each other. Reflectances of the reflective portions have tones that follow the following rules.

1. Cyclic codes are created for each of the X and Y axes, and the code values of the cyclic codes for the X axis are associated with the code values of the cyclic codes for the Y axis, in a one-to-one (1:1) correspondence, at respective coordinate (or grid) points; and 2. a reflectance of a reflective portion at each grid point is defined for a combination of a code of an X coordinate (first code) and a code of a Y coordinate (second code) as follows:

when the code of the X coordinate is 0 and the code of the Y coordinate is 0 (i.e., in the case of (0, 0)), the reflectance is 0%;

when the code of the X coordinate is 1 and the code of the Y coordinate is 0 (i.e., in the case of (1, 0)), the reflectance is 100%;

when the code of the X coordinate is 0 and the code of the Y coordinate is 1 (i.e., in the case of (0, 1)), the reflectance is 100%; and when the code of the X coordinate is 1 and the code of the Y coordinate is 1 (i.e., in the case of (1, 1)), the reflectance is 100%.

It is defined as a rule that in the two cases where the codes of the X and Y coordinates are the same, the corresponding two tones are different, whereas in the two cases where the codes of the X and Y coordinates are different, the corresponding two tones are the same.

In the configuration of the two-dimensional scale of the present modification, a light quantity distribution of reflected light in the X direction varies in accordance with codes of the Y coordinates. When the code of the Y coordinate is 1, the periodic signal is partially lost. However, by simultaneously receiving beams of reflected light from a plurality of rows of reflective portions arranged in the Y direction, a periodic signal waveform may be obtained, in which the codes 1 and 0 of the X coordinates correspond to large and small amplitudes, respectively.

Similarly, a light quantity distribution of reflected light in the Y direction varies in accordance with codes of the X coordinates. When the code of the X coordinate is 1, the periodic signal is partially lost. However, by simultaneously receiving beams of reflected light from a plurality of rows of reflective portions arranged in the X direction, a periodic signal waveform may be obtained, in which the codes 1 and 0 of the Y coordinates correspond to large and small amplitudes, respectively.

In the two-dimensional scale of the present embodiment, absolute position information for the two axes may be output by combination with signal processing systems similar to those of the first embodiment. However, it is necessary to ensure that when beams of reflected light from a plurality of mark rows arranged in the Y-axis direction are simultaneously received to obtain code information for the X axis, not all codes of the Y coordinates in the light receiving range become the same. Similarly, it is necessary to ensure that when beams of reflected light from a plurality of mark rows arranged in the X-axis direction are simultaneously received to obtain code information for the Y axis, not all codes of the X coordinates in the light receiving range become the same. Also, it is to be noted that since amplitude information is partially lost with this technique, interpolation cannot be performed by the signal processing systems similar to those of the first embodiment. Specifically, interpolation may involve a division by 0 at a moving average. In this case, for example, by using the technique of assigning a predetermined value instead of performing the division, the amplitudes of the waveform data REG(X) and REG(Y) may be normalized.

Additionally, in the two-dimensional scale SCL of the present embodiment, a reflectance of a reflective portion at each grid point may be defined in the following modified way, depending on the combination of a code of an X coordinate and a code of a Y coordinate.

Reflectance of substrate: 100%
Reflectance in the case of (0, 0): 100%
Reflectance in the case of (1, 0): 100%
Reflectance in the case of (0, 1): 100%
Reflectance in the case of (1, 1): 0%

The present embodiment uses an additional rule in which the tone in the case of (1, 0) and the tone of the substrate are the same.

In the two-dimensional scale of the fourth embodiment, the number of reflectance tones of the reflective portions is two (or one excluding the reflectance tone equal to the reflectance of the substrate). Therefore, the present embodiment may provide a two-dimensional absolute encoder or a two-dimensional scale for the two-dimensional absolute encoder which is advantageous in terms of manufacturing costs. If interpolation precision is not required, spaces between reflective portions may be removed to increase the size of the reflective portions. This makes manufacture easier.

Other Embodiments

1. In the first to fourth embodiments described above, the two-dimensional scale is illuminated with diverging light from the common light-emitting element, and reflected light from the two-dimensional scale is received by the one-dimensional light-receiving element array for the X axis and the one-dimensional light-receiving element array for the Y axis. Alternatively, a light source for the X axis and a light source for the Y axis may be provided at different locations. Also in the first to fourth embodiments described above, diverging light is used to illuminate the scale, which is magnified and projected onto the light-receiving element arrays. Alternatively, for example, a collimator lens may be used to turn light from the light source into parallel beams, with which the scale is projected at 1:1 magnification. An imaging lens may be used to form an image of the scale (i.e., an image of mark arrays on the scale) onto the light-receiving element arrays. Other optical systems may detect mark arrays on the scale.

2. The first to fourth embodiments each provide the scale of reflective type where square reflective patterns (marks) are arranged at predetermined intervals. The codes (0 and 1) in the two directions are determined by assigning two or three tones to the reflectances of the marks, excluding the reflectance of the substrate. Alternatively, a plurality of transmissive marks having the same shape but different transmission characteristics (transmittances) may be used. In this case, the one-dimensional light-receiving element arrays (detectors) detect light transmitted through marks. The tone values assigned to the reflectances (or transmittances) of the marks may be changed to other values.

3. In the first to fourth embodiments described above, the light-receiving element arrays PDA(X) and PDA(Y) are configured such that one period of a light quantity distribution is detected by 12 light-receiving elements. However, the number of the light-receiving elements that detect the one period may be changed, for example, to 3, 4, 6, or 8.

4. The light-receiving element arrays PDA(X) and PDA(Y) may be configured to simultaneously receive light beams from a wider area, so that the signal processing systems (processors PRC) use information of necessary regions. This may improve precision of interpolation values of absolute positions. Also, an appropriate signal processing configuration may be used, which reduces the influence of partial error in reading (detecting) scale information.

5. Instead of using two one-dimensional light-receiving element arrays, one two-dimensional light-receiving element array may be used, which receives (detects) reflected or transmitted light from at least some of the plurality of marks on the scale. In this case, the signal processing system may extract (and combine) information of necessary regions and perform signal processing similar to that described above. A light-projecting optical system and a light-receiving optical system may be combined together to reduce the device size.

6. Numerical expressions and values, such as thresholds, used in calculations may be changed, in accordance with variations in sensitivity among light-receiving elements of the light-receiving element arrays and variations in light quantity caused by optical systems. Approximate expressions and approximate values may be used depending on the precision required.

7. Functions equivalent to those of the signal processing systems (processors PRC) described above may be realized by other hardware, software, algorithms, or flows. For example, signals from the light-receiving element arrays may be filtered or computed by parallel analog circuits or series analog circuits. Digital information obtained by AD-converting signals from the light-receiving element arrays may be computed by field-programmable gate arrays (FPGAs).

8. Although cyclic codes are used as absolute codes in the first to fourth embodiments described above, other codes may be used.

9. In the first to fourth embodiments described above, square patterns (marks) are arranged at regular intervals to show absolute codes. Alternatively, the marks may be rectangular in shape. In this case, the distance between two adjacent marks in the X direction may be different from that between two adjacent marks in the Y direction. This means that the resolution in the X direction may be different from that in the Y direction. The marks may be circular, oval, or of other shapes. Also, the patterns do not have to be ones with clear boundaries where the reflectance (or transmittance) changes stepwise. Specifically, a tone pattern where the reflectance (or transmittance) changes continuously or periodically may be used. In other words, any scale structure may be used, as long as light for illumination is intensity-modulated by patterns (marks), and the resulting periodic patterns (light quantity distributions) are formed onto the light-receiving element arrays.

The foregoing embodiments may provide the following effects. Note that the characteristic values of the marks are not limited to reflectances or transmittances described above. Any characteristic values may be used, as long as periodic patterns may be formed by marks onto the detectors.

The integer part and the interpolation part (fractional part) of an absolute position on each axis may be obtained on the basis of the output from the same light-receiving element array. This is advantageous in providing a high-resolution and high-precision absolute encoder. Even if the light quantity distribution (pattern) formed on each light-receiving element array varies, absolute positions may be measured stably. Also, the levels of resolution, precision, and ease of handling achieved by the absolute encoder may be as high as those of incremental encoders.

As described above, a one-dimensional light-receiving element array is provided for each axis. With this configuration, it is possible to achieve quick responsiveness and high time resolution.

Patterns (marks) on the two-dimensional scale are simple patterns having two or three reflectance or transmittance tones. This facilitates design and manufacture of the two-dimensional scale.

The number of tones (i.e., the number of characteristic values) necessary for forming the marks on the two-dimensional scale is smaller than the number of combinations of the codes of X and Y coordinates. Therefore, the codes may be determined (or identified) stably. Moreover, since it is possible to ease restrictions on variations in reflectance among the marks, the two-dimensional scale may be manufactured at low cost.

The integer and interpolation parts of absolute positions may be generated by a small-scale electronic circuit, and complex signal processing is not required. It is thus possible to provide a small and inexpensive absolute encoder.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2012-201707 filed Sep. 13, 2012, which is hereby incorporated by reference herein in its entirety.

What is claimed is:

1. A two-dimensional absolute encoder comprising:
a scale having a plurality of marks arranged thereon along a first direction and a second direction different from each other;
a detector configured to perform first detection that detects a first number of marks arranged in the first direction and second detection that detects a second number of marks arranged in the second direction; and
a processor configured to obtain absolute positions of the scale in the first direction and the second direction based on outputs from the detector,
wherein each of the plurality of marks has one of a plurality of different characteristic values each corresponding to a combination of a quantized first code for indicating a position in the first direction and a quantized second code for indicating a position in the second direction, a number of the plurality of different characteristic values being smaller than a number of the combinations; and
the processor is configured to generate a first code sequence including the first number of the first codes based on a result of the first detection, obtain an absolute position of the scale in the first direction based on the first code sequence, generate a second code sequence including the second number of the second codes based on a result of the second detection, and obtain an absolute position of the scale in the second direction based on the second code sequence.

2. The encoder according to claim 1, wherein each of the first code and the second code has one of two code values; and
the characteristic values corresponding to two combinations each being a combination of the same code values are different from each other, and the characteristic values corresponding to two combinations each being a combination of different code values are the same.

3. The encoder according to claim 2, wherein the number of the characteristic values is two or three.

4. The encoder according to claim 1, wherein a characteristic related to the characteristic values is a reflection characteristic or a transmission characteristic for light which illuminates the scale.

5. The encoder according to claim 4, wherein each of the plurality of marks has a transmittance corresponding to a combination of the first code and the second code, and the detector is configured to detect light transmitted through at least a part of the plurality of marks.

6. The encoder according to claim 4, wherein each of the plurality of marks has a reflectance corresponding to a combination of the first code and the second code, and the detector is configured to detect light reflected from at least a part of the plurality of marks.

7. The encoder according to claim 1, wherein the detector includes a one-dimensional light-receiving element array for performing the first detection and a one-dimensional light-receiving element array for performing the second detection.

8. The encoder according to claim 1, wherein the detector includes a plurality of photoelectric conversion elements arranged in each of the first direction and the second direction at an interval smaller than an interval of the plurality of marks on the detector; and
the processor is configured to generate the first code sequence by quantizing respective amplitudes of the first number of periodic signals output from the detector, obtain first position data in the first direction from the first code sequence, generate the second code sequence by quantizing respective amplitudes of the second number of periodic signals output from the detector, obtain second position data in the second direction from the second code sequence, obtain third position data in the first direction from a phase of at least one of the first number of periodic signals, and obtain fourth position data in the second direction from a phase of at least one of the second number of periodic signals; and
the processor is configured to generate data representing the absolute position of the scale in the first direction based on the first position data and the third position data, and generates data representing the absolute position of the scale in the second direction based on the second position data and the fourth position data.

9. A scale for a two-dimensional absolute encoder, the scale having a plurality of marks arranged thereon along a first direction and a second direction different from each other,
wherein each of the plurality of marks has one of a plurality of different characteristic values each corresponding to a combination of a quantized first code for indicating a position in the first direction and a quantized second code for indicating a position in the second direction, a number of the plurality of different characteristic values being smaller than a number of the combinations.

10. A two-dimensional absolute encoder comprising a scale having a plurality of marks arranged thereon along a first direction and a second direction different from each other, the encoder being configured to obtain absolute positions of the scale in the first direction and the second direction,
wherein the scale is a scale defined in claim 9.

11. The encoder according to claim 1, wherein the detector is configured to perform, as the first detection, detection of rows of the first number of marks arranged in the first direction, and, as the second detection, detection of rows of the second number of marks arranged in the second direction.

* * * * *